(12) United States Patent
Harris

(10) Patent No.: US 11,754,047 B2
(45) Date of Patent: Sep. 12, 2023

(54) WAVE, WIND AND TIDAL ENERGY GENERATOR

(71) Applicant: Triflux Energy LLC, Glendale, CA (US)

(72) Inventor: Andre Harris, Glendale, CA (US)

(73) Assignee: Triflux Energy LLC, Glendale, CA (US)

(*) Notice: Subject to any disclaimer, the term of this patent is extended or adjusted under 35 U.S.C. 154(b) by 0 days.

(21) Appl. No.: 17/808,073

(22) Filed: Jun. 21, 2022

(65) Prior Publication Data

US 2022/0403825 A1 Dec. 22, 2022

Related U.S. Application Data

(60) Provisional application No. 63/202,745, filed on Jun. 22, 2021.

(51) Int. Cl.
*F03D 9/00* (2016.01)

(52) U.S. Cl.
CPC ........ *F03D 9/008* (2013.01); *F05B 2220/703* (2020.08)

(58) Field of Classification Search
CPC .......... F03D 9/008; F03D 13/25; F03D 80/82; F03D 80/85; F05B 2220/703
See application file for complete search history.

(56) References Cited

U.S. PATENT DOCUMENTS

| | | |
|---|---|---|
| 3,546,473 A | 12/1970 | Rich |
| 4,539,485 A | 9/1985 | Neuenschwander |
| 5,347,186 A | 9/1994 | Konotchick |
| 5,696,413 A | 12/1997 | Woodbridge et al. |
| 6,515,375 B1 | 2/2003 | Beal |
| 6,791,205 B2 | 9/2004 | Woodbridge |
| 6,798,090 B2 | 9/2004 | Cheung et al. |
| 7,303,369 B2 | 12/2007 | Rowan et al. |

(Continued)

OTHER PUBLICATIONS

Magnetically Levitated Vertical-Axis Wind Turbine—Gene Abbascia et al, Apr. 30, 2009.

(Continued)

*Primary Examiner* — Juan G Flores
*Assistant Examiner* — Jason G Davis
(74) *Attorney, Agent, or Firm* — Phil IP Law Inc.; Narek Zohrabyan; Karen 'Kirk' Galoyan

(57) ABSTRACT

A wind turbine and wave/tidal energy apparatus has a vertical axis blade assembly, a lower cylindrical tube and an upper cylindrical tube. A rotor shaft is connected to the blade assembly and the upper cylindrical tube. A magnetic chamber is housed inside an upper cylindrical frame and is connected with the blade assembly through the rotor shaft. The frictionless levitation chamber is housed inside the upper cylindrical frame. The rotor shaft may protrude through the magnetic chamber into the frictionless levitation chamber and may have a magnet attached on the end of the rotor shaft. The magnetic array chamber is housed inside the lower cylindrical frame and may have a magnetic array axle with plurality of fixed magnets on it. The magnetic array axle may protrude into the frictionless levitation chamber and have a magnet attached to it. The floating inductive coil is located externally of the lower cylindrical frame.

13 Claims, 8 Drawing Sheets

(56) References Cited

U.S. PATENT DOCUMENTS

| | | |
|---|---|---|
| 7,462,950 B2 | 12/2008 | Hu |
| 7,573,163 B2 | 8/2009 | Tu et al. |
| 8,134,281 B2 | 3/2012 | Rastegar et al. |
| 8,338,976 B2 | 12/2012 | Kazadi |
| 8,629,572 B1 | 1/2014 | Phillips |
| 8,796,878 B1 | 8/2014 | Hill |
| 8,933,578 B2 | 1/2015 | Choi et al. |
| 8,963,374 B2 | 2/2015 | Wang |
| 10,047,717 B1 | 8/2018 | Phillips |
| 10,526,056 B1 | 1/2020 | Hakki et al. |
| 11,053,921 B2 * | 7/2021 | Gong .................. F03D 9/007 |
| 2016/0010619 A1 | 1/2016 | Phillips |
| 2020/0095982 A1 | 3/2020 | Shi et al. |

OTHER PUBLICATIONS

Power performance and dynamic responses of a combined floating vertical axis wind turbine and wave energy converter concept—Zhengshun Cheng et al, 2019.

Wave Energy, a technology brief on wave energy converters (WECs) that harvest energy from ocean waves—Wave Energy—The Liquid Grid [https://theliquidgrid.com/marine-clean-technology/wave-energy-converters/#:~:text=Wave energy converters can generally], last accessed Feb. 2, 2021.

Review Paper on Wind Turbine using Magnetic Levitation—International Journal of research in Mechanical engineering & technology, 2015-2016.

* cited by examiner

WAVE, WIND AND TIDAL ENERGY GENERATOR

PRIORITY CLAIMS AND CROSS-REFERENCE TO RELATED APPLICATIONS

This application is related to and claims domestic priority benefits, per 35 USC § 119(e), from U.S. Provisional Patent Application Ser. No. 63/202,745 filed on Jun. 22, 2021, the entire contents, of the aforementioned application, are expressly incorporated hereinto by reference.

BACKGROUND

The disclosure here relates to the field of energy converters (electricity generation), in particular, to a device for generating electricity from motion derived from tides/waves and wind.

Since ancient times, people have been using renewable sources of energy such as wind and wave/tide. For example, circa 1000 B.C, the oldest known vertical type of windmill design was used in ancient Persia to turn a grindstone. The sails of the windmill rotate due to them being faced to the wind as the wind pushes them.

The most common device for converting wind energy into electricity are wind turbines. Wind turbines are rotary devices, which coupled with a generator or an alternator, provide a renewable source of electricity that does not require burning of fossil fuels and thus eliminating $CO_2$ emissions. Usually, wind turbines are supported by one or more bearing assemblies which provide an ability to rotate the blades with minimal friction. As friction is reduced, the more efficient the energy production becomes.

One of the first patents for conversion of wave energy dates backed to 1799, and was filed in Paris. Around 1910, Bochaux-Praceique built a wave-powered device to power his house at Royan, near Bordeaux in France. From 1855 to 1973, there were already 340 patents filed in the UK alone. Nowadays there are more than 7,400 patents on this topic.

There are different types of devices converting ocean's wave energy. Some devices convert wave energy to electricity with minimal interaction with marine life, beaches, and navigational routes.

Yet other designs in the marine energy sector are point absorbers, which are wave energy converters having floating type structures. Common design for a point absorber is that it has one end or part fixed relative to the water surface and the other end or part freely moving in a vertical/linear motion as the waves or tide move it up and down. The resulting movement can be used to drive a linear generator and convert linear motion into electricity.

Nowadays, offshore wind and tidal energy conversion has become a new direction of international power development and attracted R&D around the world. As the rise of environmental pollution has posed major health hazards to the planet and its population, the development of wind and wave energy is of great significance.

Many countries in the world have acted to increase the renewable energy sources such as wind and wave. For example, China, in 2020, produced 288.32 Gigawatt (GW) of wind energy, U.S. produced 122 GW, Germany 63 GW, India 37 GW, Spain 27.4. In comparison, offshore wind production is less than onshore wind production. For instance, China, in 2020, produced only 10 GW of energy from offshore wind generators. The leading country in offshore wind generators is the UK with more than 10.8 GW. However, UK is planning to increase this number to 40 GW by 2026.

SUMMARY

In accordance with an aspect of the invention, there is provided a wind turbine and wave/tidal energy apparatus, which may include a vertical axis blade assembly, a lower cylindrical frame and an upper cylindrical frame rigidly connected to each other, having an interior cavity. Moreover, the system may have the vertical axis blade assembly connected to a top section of a rotor shaft where the upper cylindrical frame which may be connected to a bottom section of the rotor shaft. Additionally, the system may have a magnetic chamber which may be housed inside an upper part of the upper cylindrical frame and a frictionless levitation chamber which may be housed inside a lower part of the upper cylindrical frame. Furthermore, the system may have a revolving permanent magnet attached to bottom of the rotor shaft, may have a magnetic array chamber housed inside the lower cylindrical frame, may have a plurality of magnets attached to a magnetic array axle, may have a static permanent magnet attached to top of the magnetic array axle; and an inductive coil which may be externally located on the lower cylindrical frame.

The system's vertical axis blade assembly has a plurality of blades and the frictionless levitation chamber is located below the magnetic chamber.

The system's revolving permanent magnet is located in the frictionless levitation chamber and the magnetic array axle is located along the length of the lower cylindrical frame.

The system's static permanent magnet is located in the frictionless levitation chamber and a plurality of magnets are connected to the magnetic axle.

The system's plurality of magnets are spaced apart and the inductive coil is connected to a plurality of buoys.

The system's inductive coil is connected to a plurality of anchoring cables and bottom of the magnetic array axle is connected to a bottom cap of the lower cylindrical frame.

The system's floating assembly is connected to an upper part of the lower cylindrical frame and a cylindrical ballast footing is connected to bottom of the lower cylindrical frame.

DESCRIPTION OF THE DRAWINGS

Embodiments in accordance with the present invention are shown in the drawings and will be described below with reference to the figures, whereby elements having the same effect have been provided with the same reference numerals.

The following is shown.

DESCRIPTION

Exemplified embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
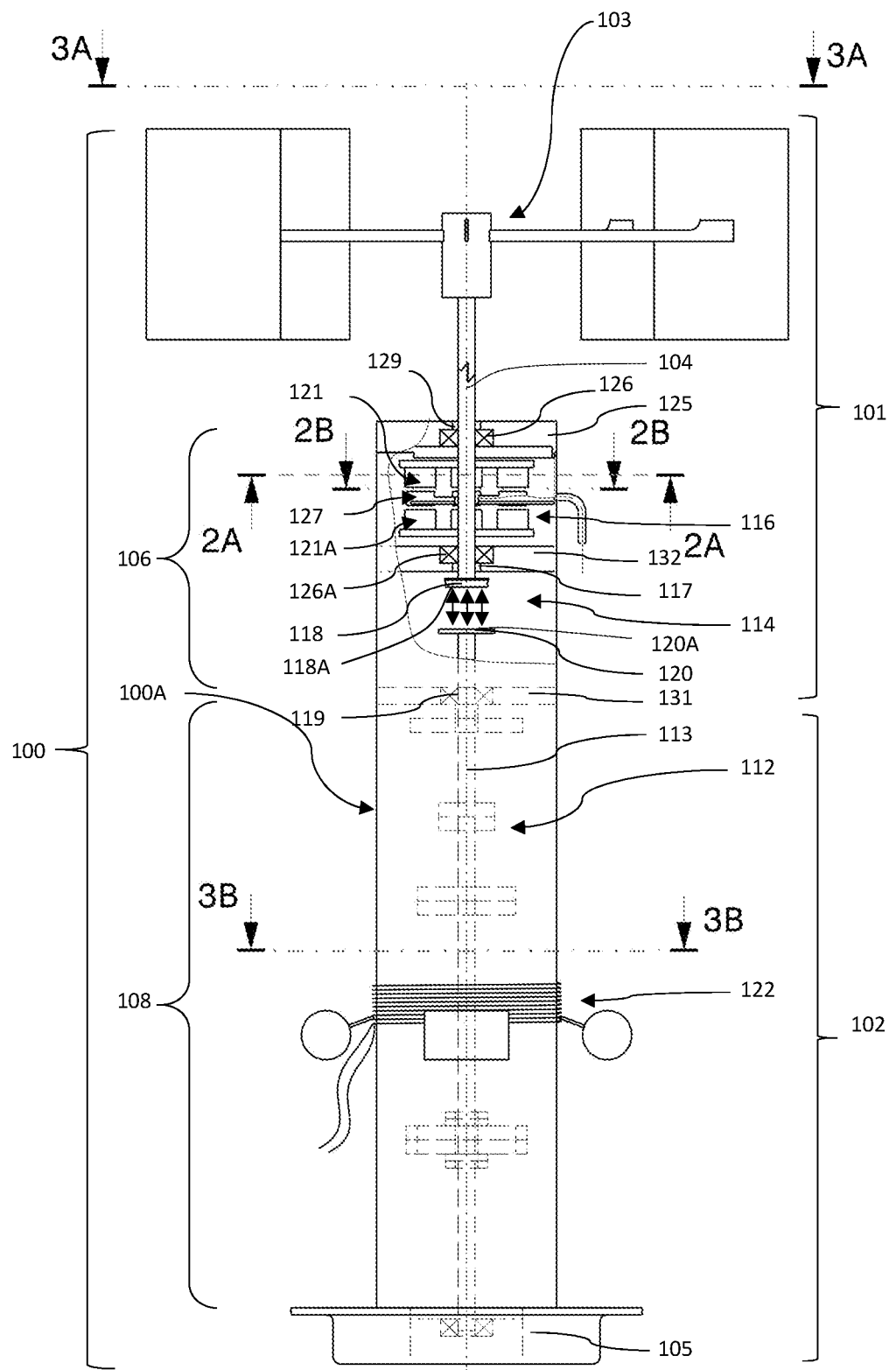
FIG. 1 shows a side view of a wind turbine and wave/tidal energy generator in accordance with an embodiment having a stationary structure.

FIG. 1 exemplifies a side view of an embodiment of the wind turbine and wave/tidal energy generator 100 having a stationary structure. Wind turbine and wave/tidal energy generator 100 may incorporate, in its upper part, a vertical axis wind turbine energy generator 101 and in the lower part, a wave/tidal energy generator 102. The cylindrical frame 100A of the wind turbine and wave/tidal energy generator 100 may incorporate an upper cylindrical frame 106 and a lower cylindrical frame 108.

The vertical axis wind turbine energy generator 101, in the upper part, may incorporate a vertical axis blade assembly 103, which may be connected to the rotor shaft 104 traveling through to the magnetic rotor chamber 116. An upper cylindrical frame 106 (also shown in FIG. 4 as 406), can include a magnetic rotor chamber 116 and a frictionless levitation chamber 114.

The magnetic rotor chamber 116 may have a first through hole 129 disposed at top cap 125, and a second through hole 117 disposed at partition wall 132. The first bearing 126 may be provided in the first through hole 129 and the second bearing 126A may be provided in the second through hole 117. The rotor shaft 104 may be pivotally placed within the magnetic rotor chamber 116 through the first bearing 126 in the top cap 125 and through the second bearing 126A in partition wall 132. Magnet assemblies 121 and 121A are fixed to the rotor shaft 104 and in between them is located the static induction coil assembly 127 (more detailed explanation in FIG. 4, below). Rotor shaft 104 may freely rotate, responsive to the wind force exerting unto the vertical axis blade assembly 103, which rotates the magnet assemblies 121 and 121A around the static induction coil assembly 127 in order to generate electricity. Static induction coil assembly 127 may be secured to the upper cylindrical frame 106 (more detailed explanation in FIGS. 2B and 4, below). The wind turbine and wave/tidal energy generator 100 is positioned in a body of water such that the upper cylindrical frame 106 and the vertical axis wind turbine energy generator 101 may be elevated above the water line.

The wave/tidal energy generator 102, at the base, may incorporate a cylindrical ballast foot 105 connected to bottom of the lower cylindrical frame 108 which internally may incorporate magnetic array chamber 112 and externally may incorporate floating induction coil assembly 122. The floating induction coil assembly 122 may rise and fall, responsive to the wave/tidal motion, thereby generating electricity due to induction as the floating induction coil assembly 122 interacts with the magnetic array chamber 112 (explained in detail below). The magnetic array chamber 112 may incorporate a magnetic array axle 113. A plurality of magnets may be attached to the magnetic array axle 113 in some order along the length of the magnetic array axle 113. The magnetic array axle 113 may be secured in the upper portion to the partition wall 131 and in the lower portion to the cylindrical ballast foot 105. The wave/tidal energy generator 102 may be submerged into the body of water in such a way that the floating induction coil assembly 122 could rise and fall in response to the waves/tides, at least along the length of the lower cylindrical frame 108.

Frictionless levitation chamber 114 is located between the partition wall 132 and the partition wall 131. Partition wall 131 may have a through hole 119. The magnetic array axle 113 may be inserted into the through hole 119 and protruding into the frictionless levitation chamber 114 and terminating with an attached static permanent magnet 120. The rotor shaft 104 may be inserted through the second through hole 117 into the frictionless levitation chamber 114 and terminated with a revolving permanent magnet 118.

The static permanent magnet 120 may have repulsive surface 120A which may be counterposing the repulsive surface 118A of the revolving permanent magnet 118 such that a distance between them is created and maintained due to the force of having like magnetic poles facing one another. This repelling force causes the rotor shaft 104 to levitate. The levitation force may be formed between the static permanent magnet 120 and the revolving permanent magnet 118. The levitation force reduces resistance while the rotor shaft 104 is driven by the vertical axis blade assembly 103 because the friction otherwise created is minimized if not eliminated. Inevitably, this increases revolving efficiency and speed.

Figure 2A:
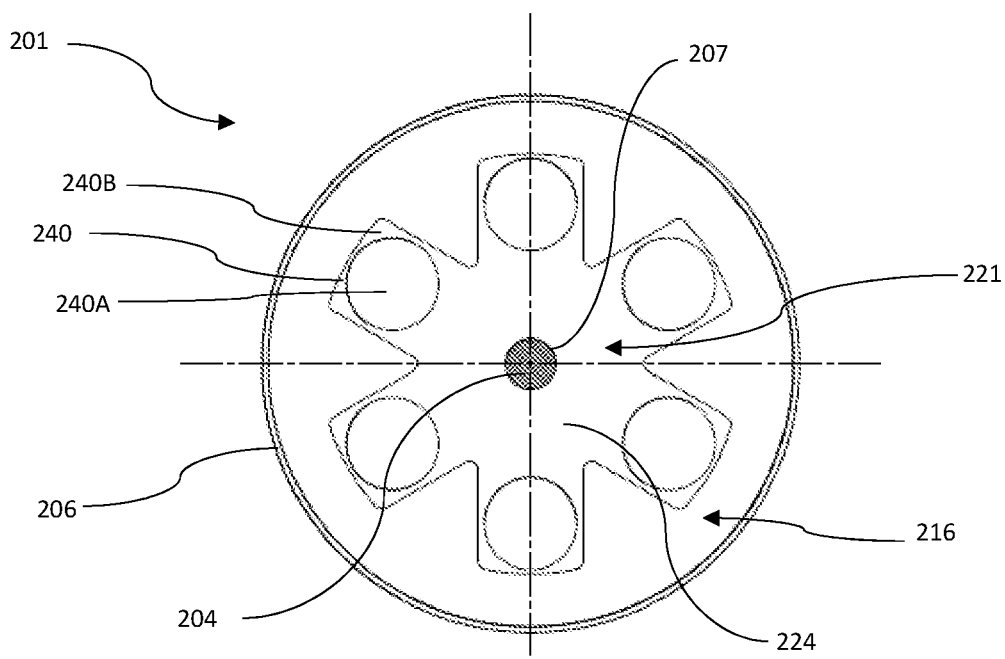
FIG. 2A shows a bottom-up cross-sectional view of the vertical axis of the wind turbine energy generator's magnetic chamber.

FIG. 2A exemplifies a bottom-up cross-sectional view of the vertical axis wind turbine energy generator 201, viewed across line 2A. Referring to the magnetic rotor chamber 216 which may be internally positioned in the upper cylindrical frame 206 and may have magnet assembly 221 that incorporates assembly disc 224. Assembly disc 224 may have a star like shape with plurality of arms 240B. Each of which may have permanent magnets 240 fixed unto the arms 240B. Each of the plurality of permanent magnets 240 may have surface 240A with the same magnetic polarity. Assembly disc 224 may have a through hole 207 disposed at the center of the assembly disc 224; through which the rotor shaft 204 may be inserted. Assembly disc 224 is secured to the rotor shaft 204 through the through hole 207. When rotor shaft 204 revolves, the magnet assembly 221 also rotates. Other embodiments may exist which include different constellations of shapes of the assembly disc 224 or different number of arms 240B of the assembly disc 224.

Figure 2B:
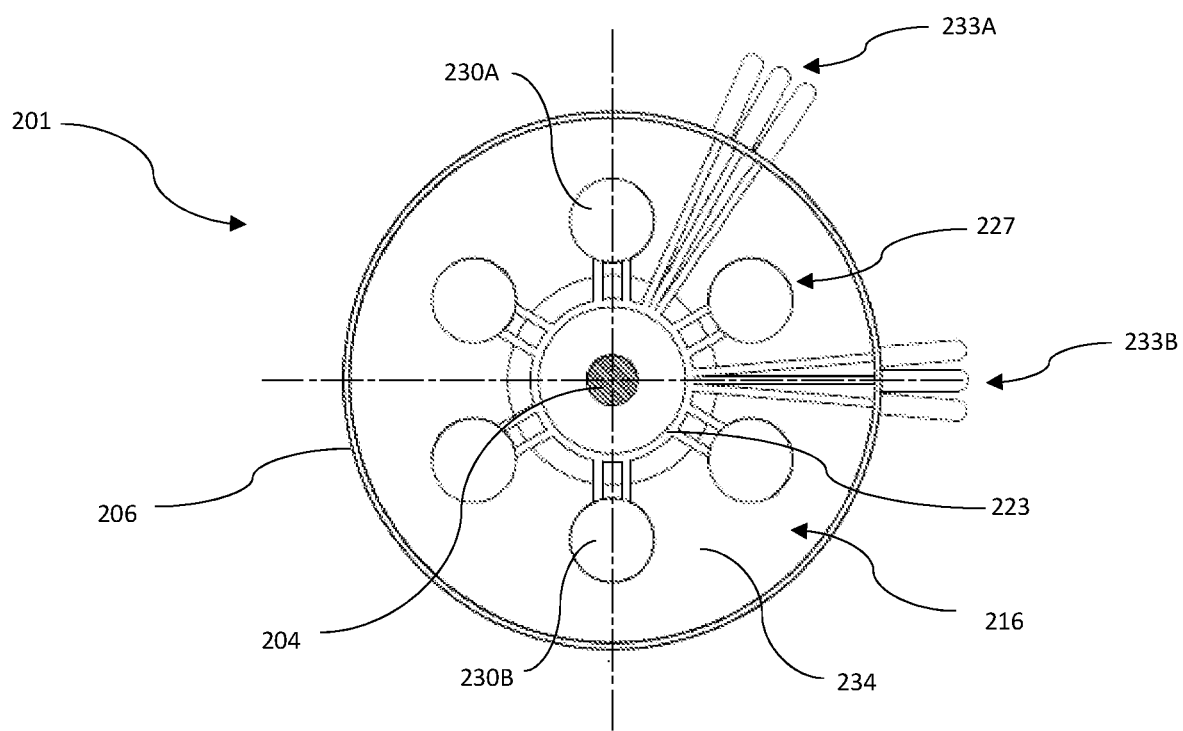
FIG. 2B shows a top-down cross-sectional view of the vertical axis of the wind turbine energy generator's magnetic chamber.

FIG. 2B exemplifies a top-down cross-sectional view of the vertical axis wind turbine energy generator 201, viewed across line 2B. Referring to the magnetic rotor chamber 216 which may be internally positioned in the upper cylindrical frame 206 and may have the static induction coil assembly 227. The static induction coil assembly 227 may incorporate induction coil supporting frame 223 connected with series pairs of induction coils 230A and 230B on the assembly disc 234. Assembly disc 234 may have openings and grooves that corresponds to the induction coil supporting frame 223 and series pairs of induction coils 230A and 230B. The induction coil supporting frame 223 and series pairs of induction coils 230A and 230B may be firmly secured in the assembly disc 234 (more detailed explanation in FIG. 4, below). Wires run in through the wire conduit 233A connecting in series pairs of induction coils 230A and 230B and run out through wire conduit 233B for further connection with other extension wires or electrical apparatus. Multiple wire conduits may be integrated depending on the number of desired series of pairs of induction coils 230A and 230B. The induction coil pairs illustrated here, but not enumerated, are also connected with one-another in series. The series pairs of induction coils 230A and 230B are referenced as exemplary of the system.

Figure 3A:
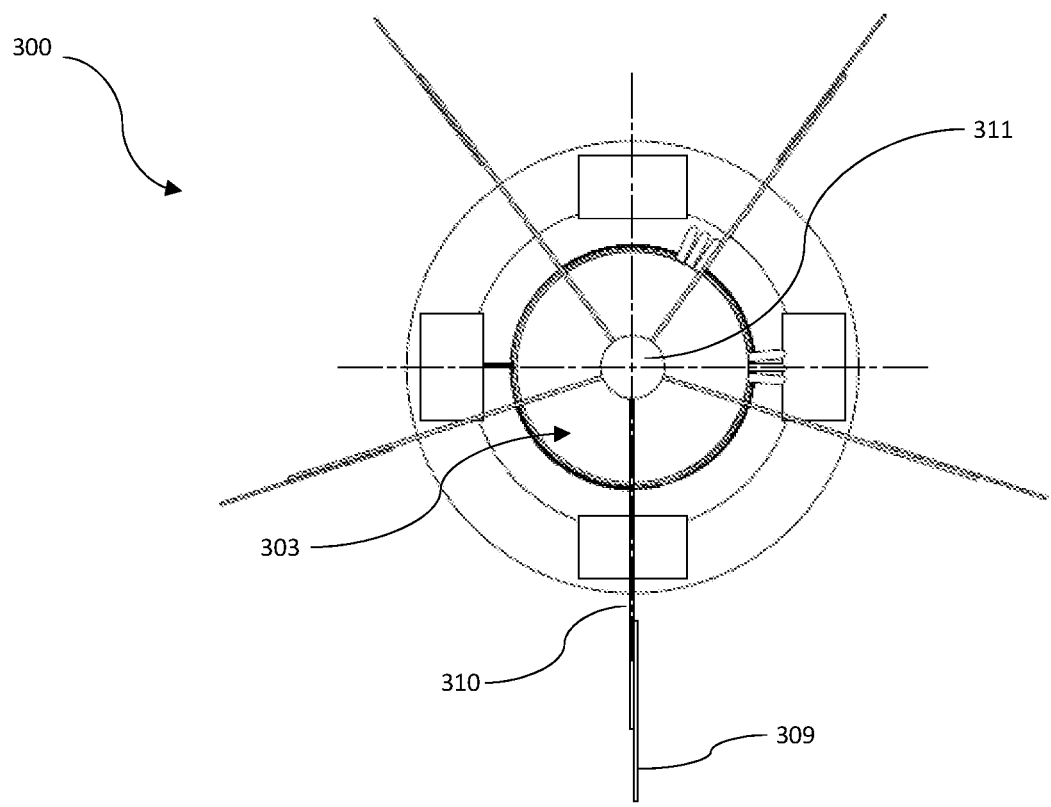
FIG. 3A shows a top view of the wind turbine and wave/tidal energy generator.

FIG. 3A exemplifies a top view of the wind turbine and wave/tidal energy generator 300, viewed across line 3A. Referring to the vertical axis blade assembly 303, the plurality of blades 309 may be connected to the plurality of supporting arms 310 which may be fixed to hub 311. The kinetic energy from the wind is captured by the plurality of blades 309 thereby rotating the vertical axis assembly 303 around rotor shaft 104 (see FIG. 1).

Figure 3B:
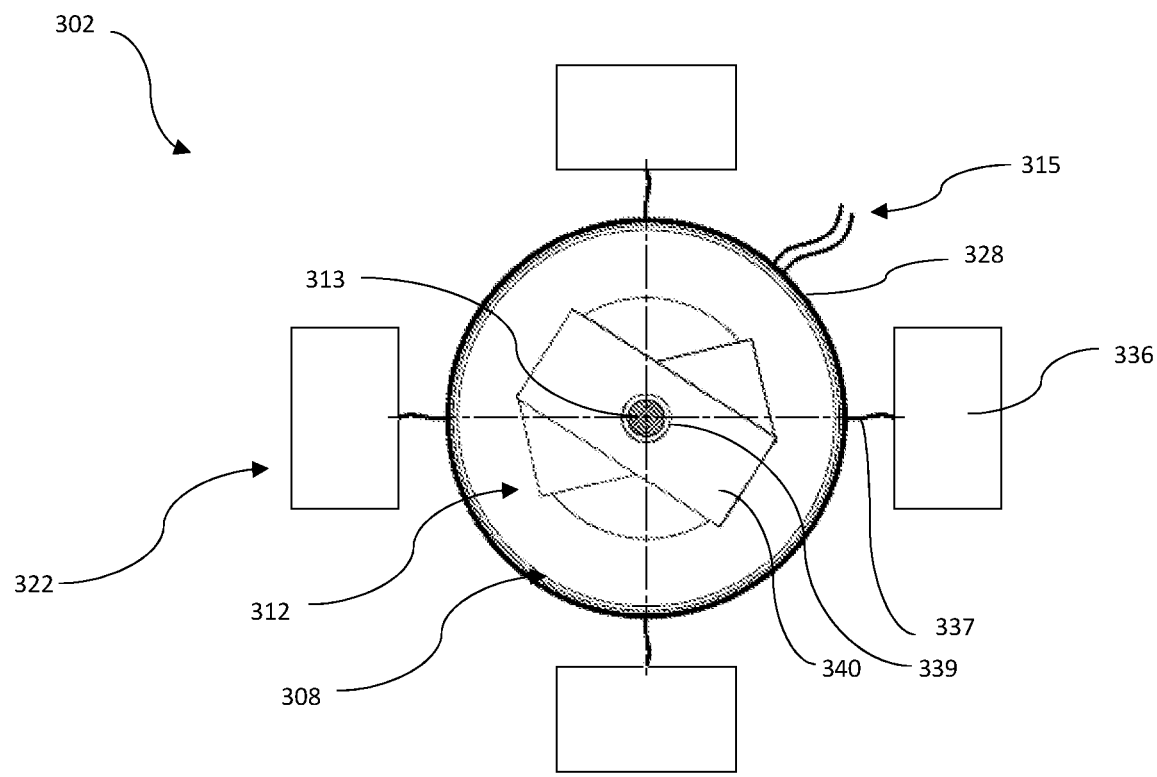
FIG. 3B shows a top cross-sectional view of the wave/tidal energy generator.

FIG. 3B exemplifies a cross sectional top view of the wave/tidal energy generator 302, viewed across line 3B. Referring to the lower cylindrical frame 308, it may internally incorporate the magnetic array chamber 312. Magnetic array chamber 312 may incorporate magnetic array axle 313 to which a plurality of magnets 340 may be secured through the through hole 339. The lower cylindrical frame 308 may externally incorporate floating induction coil assembly 322. The floating induction coil assembly 322 may incorporate an induction coil 328 which may be connected with buoys 336 through cables 337. Buoys 336 may be connected with the magnetic induction coil 328 in such a way that the floating induction coil assembly 322 rises and falls with the motion of incoming waves or tides. Thereby, the floating induction coil assembly 322 induces electrical current by the reciprocating motion, in relation to the magnetic array chamber 312. Respective ends 315 of the floating induction coil assembly 322 extend out for further connection with other extension wires or external apparatus.

Figure 4:
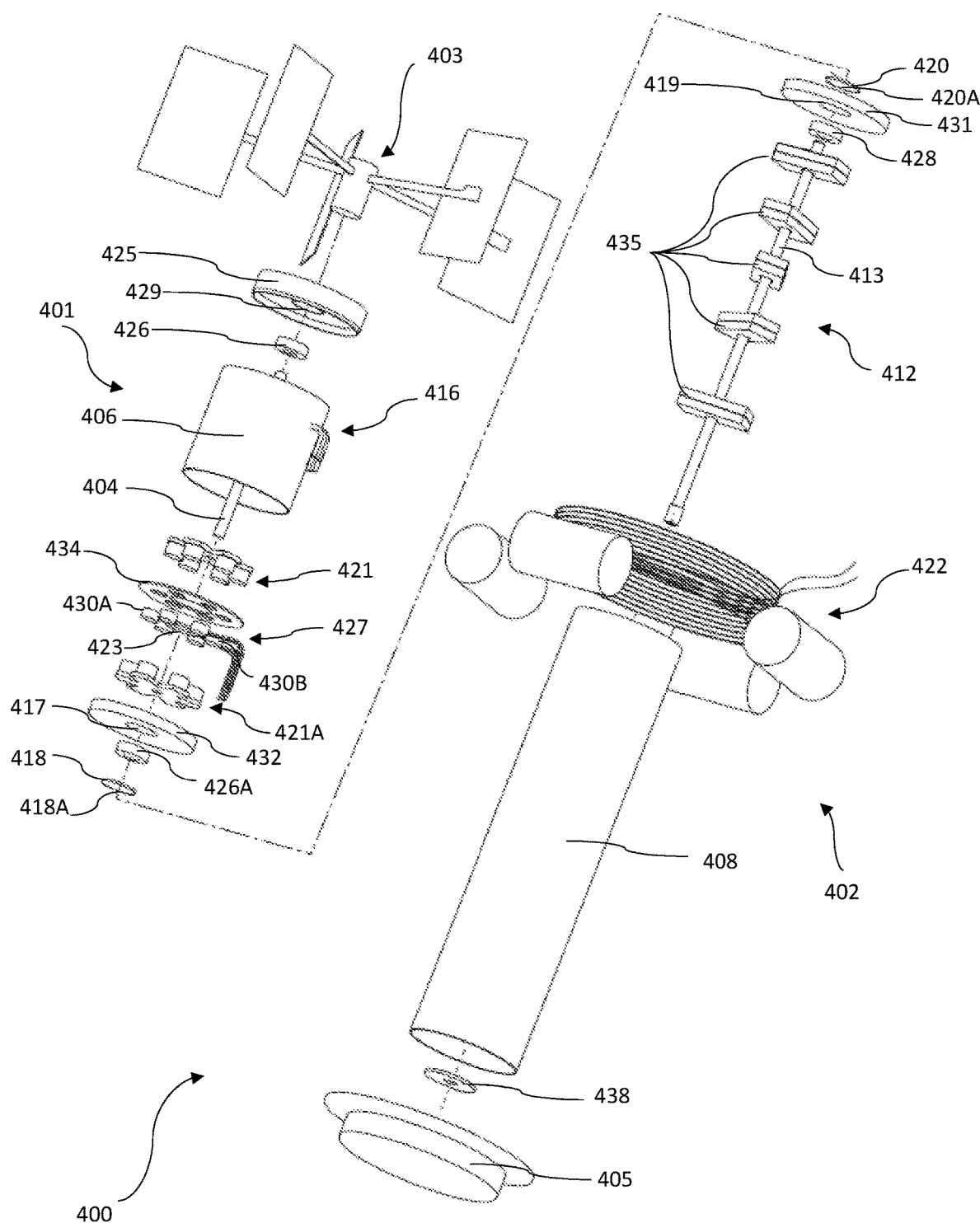
FIG. 4 shows an exploded view of the wind turbine and wave/tidal energy generator.

FIG. 4 exemplifies an exploded view of the wind turbine and wave/tidal energy generator 400 to show the constituent parts in more detail. The upper part of the wind turbine and wave/tidal energy generator 400 may incorporate, in its upper part, a vertical axis wind turbine energy generator 401 and in the lower part, a wave/tidal energy generator 402. The vertical axis wind turbine energy generator 401, may incorporate a vertical axis blade assembly 403, which may be connected to the rotor shaft 404 traveling through to the magnetic rotor chamber 416.

An upper cylindrical frame 406 can include a magnetic rotor chamber 416. The magnetic rotor chamber 416 may have a first through hole 429 disposed at top cap 425, and a second through hole 417 disposed at partition wall 432. The first bearing 426 may be provided in the first through hole 429 and the second bearing 426A may be provided in the second through hole 417. The rotor shaft 404 may be pivotally placed within the magnetic rotor chamber 416 through the first bearing 426 in the top cap 425 and through the second bearing 426A in partition wall 432.

Magnet assemblies 421 and 421A are fixed to the rotor shaft 404 and in between them is located the static induction coil assembly 427. The static induction 427 may incorporate induction coil supporting frame 423. Assembly disc 434 may have openings and grooves that corresponds to the induction coil supporting frame 423, and series pairs of induction coils 430A and 430B. The induction coil supporting frame 423 and series pairs of induction coils 430A and 430B may be firmly secured in the assembly disc 434. Static induction coil assembly 427 may be secured to the upper cylindrical frame 406.

The wave/tidal energy generator 402, at the base, may incorporate a cylindrical ballast foot 405 connected to the bottom of the lower cylindrical frame 408 which internally may incorporate a magnetic array chamber 412 and externally may incorporate floating induction coil assembly 422. The magnetic array chamber 412 may incorporate a magnetic array axle 413. A plurality of magnets 435 may be attached to the magnetic array axle 413 in some order along the length of the magnetic array axle 413. The magnetic array axle 413 may be secured in the upper portion to the partition wall 431 and in the lower portion to the cylindrical ballast foot 405 inserted to through washer 438

Partition wall 431 may have a through hole 419. The magnetic array axle 413 may be inserted into the third bearing 428 which in turn is inserted through hole 419 and terminated with an attached static permanent magnet 420.

The rotor shaft 404 may be inserted through the second bearing 426A which is in turn inserted through the second through hole 417 and terminated with a revolving permanent magnet 418. The static permanent magnet 420 may have a repulsive surface 420A which may be counterposing the repulsive surface 418A of the revolving permanent magnet 418.

Figure 5:
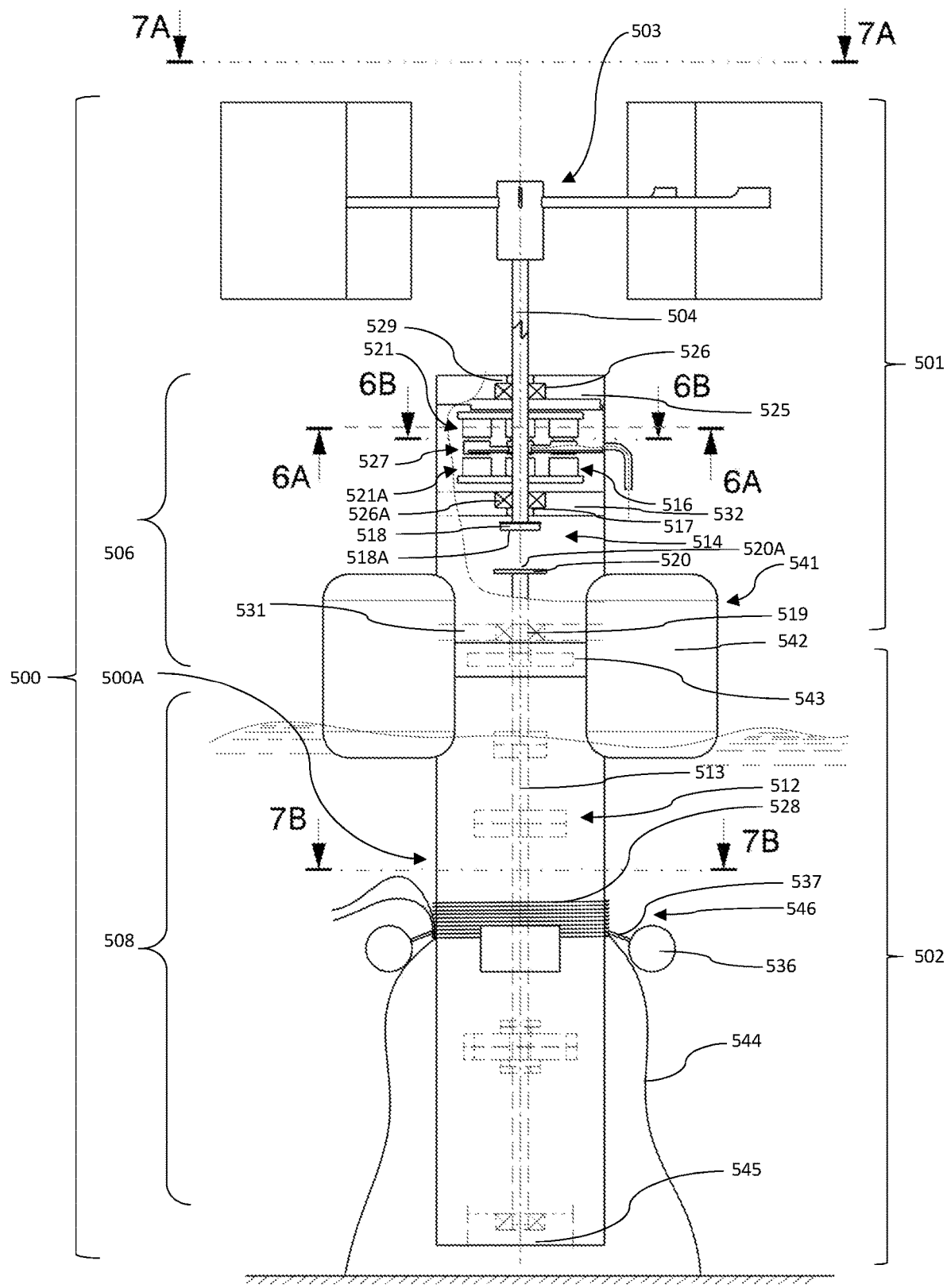
FIG. 5 shows a side view of a wind and wave/tidal energy generator in accordance with another embodiment having a floating structure.

FIG. 5 exemplifies a side view of an embodiment of the wind turbine and wave/tidal energy generator 500 having a floating structure. Wind turbine and wave/tidal energy generator 500 may incorporate, in its the upper part, a vertical axis wind turbine energy generator 501 and in the lower part, a wave/tidal energy generator 502. The cylindrical frame 500A of the wind turbine and wave/tidal energy generator 500 may incorporate an upper cylindrical frame 506 and a lower cylindrical frame 508.

The vertical axis wind turbine energy generator 501, in the upper part, may incorporate a vertical axis blade assembly 503, which may be connected to the rotor shaft 504 traveling through to the magnetic rotor chamber 516. An upper cylindrical frame 506 (also shown in FIG. 8 as 816), can include a magnetic rotor chamber 516 and a frictionless levitation chamber 514.

The magnetic rotor chamber 516 may have a first through hole 529 disposed at top cap 525, and a second through hole 517 disposed at partition wall 532. The first bearing 526 may be provided in the first through hole 529 and the second bearing 526A may be provided in the second through hole 517. The rotor shaft 504 may be pivotally placed within the magnetic rotor chamber 516 through the first bearing 526 in the top cap 525 and through the second bearing 526A in partition wall 532. Magnet assemblies 521 and 521A are fixed to the rotor shaft 504 and in between them is located the static induction coil assembly 527 (more detailed explanation in FIG. 8, below). Rotor shaft 504 may freely rotate, responsive to the wind force exerting unto the vertical axis blade assembly 503, which rotates the magnet assemblies 521 and 521A around the static induction coil assembly 527 in order to generate electricity. Static induction coil assembly 527 may be secured to the upper cylindrical frame 506 (more detailed explanation in FIGS. 6B and 8, below). The wind turbine and wave/tidal energy generator 500 may be positioned in a body of water such that the upper cylindrical frame 506 and the vertical axis wind turbine energy generator 501 may be elevated above the water line.

The wave/tidal energy generator 502 may incorporate a lower cylindrical frame 508 which internally may incorporate a magnetic array chamber 512 and externally may incorporate relatively static induction coil assembly 546 and floating assembly 541. The floating assembly 541 may incorporate a plurality of buoys 542 connected to a ring 543. Ring 543 may have the same diameter as the lower cylindrical frame 508 such that there is a snug fit between them. Wind turbine and wave/tidal energy generator 500, except relatively static induction coil assembly 546, may rise and fall, responsive to the wave/tidal motion due to floating assembly 541, thereby generating electricity due to the induction created between the relatively static induction coil assembly 546 interacting with the magnetic array chamber 512.

The magnetic array chamber 512 may incorporate a magnetic array axle 513. A plurality of magnets may be attached to the magnetic array axle 513 in some order along the length of the magnetic array axle 513. The magnetic array axle 513 may be secured in the upper portion to partition the wall 531 and in the lower portion to the lower cylindrical frame bottom cap 545. The lower cylindrical frame 508 may externally incorporate relatively static induction coil assembly 546 which includes the plurality of buoys 536. A plurality of buoys 536 may be attached to the induction coil 528 through a plurality of cables 537.

A plurality of anchoring cables 544 may be attached on the one end to the induction coil 528 and on the other end to seabed, restraining the upward movement of relatively static induction coil assembly 546. The wave/tidal energy generator 502, due to positioning of the floating assembly 541, may be submerged into the body of water in such a way that the relatively static induction coil assembly 546 could remain in the same position in relation to the seabed while cylindrical frame 500A may rise and fall in response to the waves/tides, at least along the length of the lower cylindrical frame 508.

Frictionless levitation chamber 514 is located between the partition wall 532 and the partition wall 531. Partition wall 531 may have a through hole 519. The magnetic array axle 513 may be inserted into the through hole 519 and protruding into the frictionless levitation chamber 514 and terminating with an attached static permanent magnet 520. The rotor shaft 504 may be inserted through the second through hole 517 into the frictionless levitation chamber 514 and terminated with a revolving permanent magnet 518.

The static permanent magnet 520 may have repulsive surface 520A which may be counterposing the repulsive surface 518A of the revolving permanent magnet 518 such that a distance between them is created and maintained due to the force of having like magnetic poles facing one another. This repelling force causes the rotor shaft 504 to levitate. The levitation force may be formed between the static permanent magnet 520 and the revolving permanent magnet 518. The levitation force reduces resistance while the rotor shaft 504 is driven by the vertical axis blade assembly 503 because the friction otherwise created is minimized if not entirely eliminated. Inevitably, this increases revolving efficiency and speed.

Figure 6A:
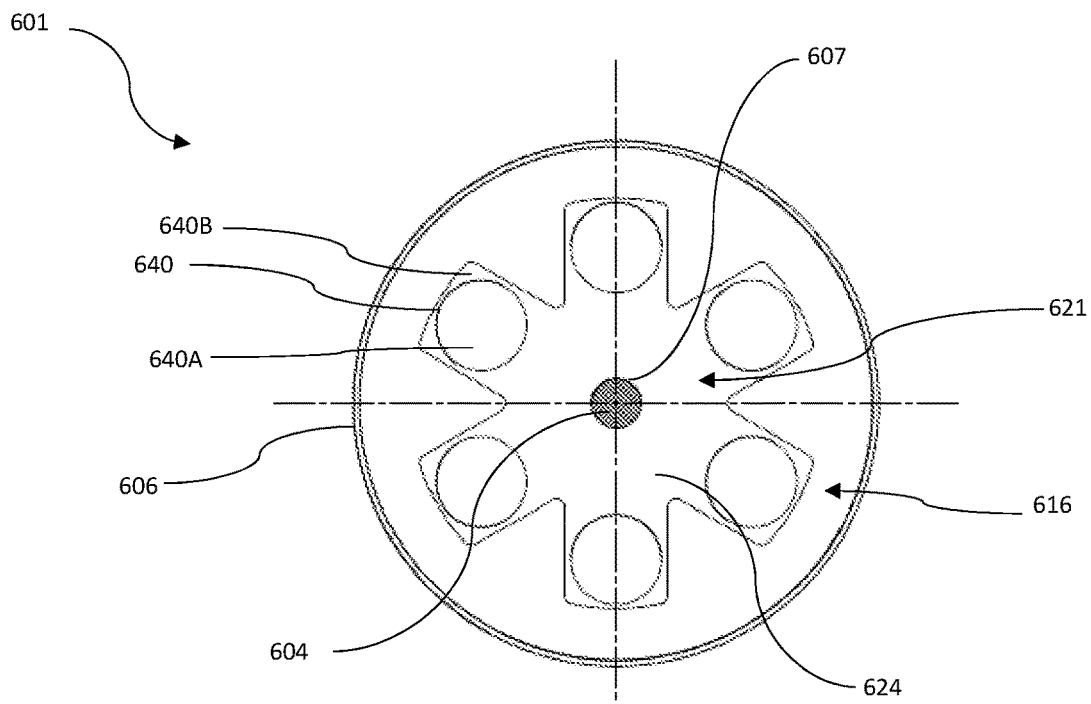
FIG. 6A shows a bottom-up cross-sectional view of the vertical axis of the wind turbine energy generator's magnetic chamber.

FIG. 6A exemplifies a bottom-up cross-sectional view of the vertical axis wind turbine energy generator 601, viewed across line 6A. The magnetic rotor chamber 616 may be internally positioned in the upper cylindrical frame 606 and may have magnet assembly 621 that incorporates assembly disc 624. Assembly disc 624 may have a star like shape with plurality of arms 640B. Each of which may have permanent magnets 640 fixed unto the arms 640B. Each of the plurality of permanent magnets 640 may have surface 640A with the same magnetic polarity. Assembly disc 624 may have a through hole 607 disposed at the center of assembly disc 624, through which the rotor shaft 604 may be inserted. Assembly disc 624 is secured to the rotor shaft 604 through the through hole 607. When rotor shaft 604 revolves, the magnet assembly 621 also rotates. Other embodiments may exist which include different constellations of shapes of the assembly disc 624 or different number of arms 640B of the assembly disc 624.

Figure 6B:
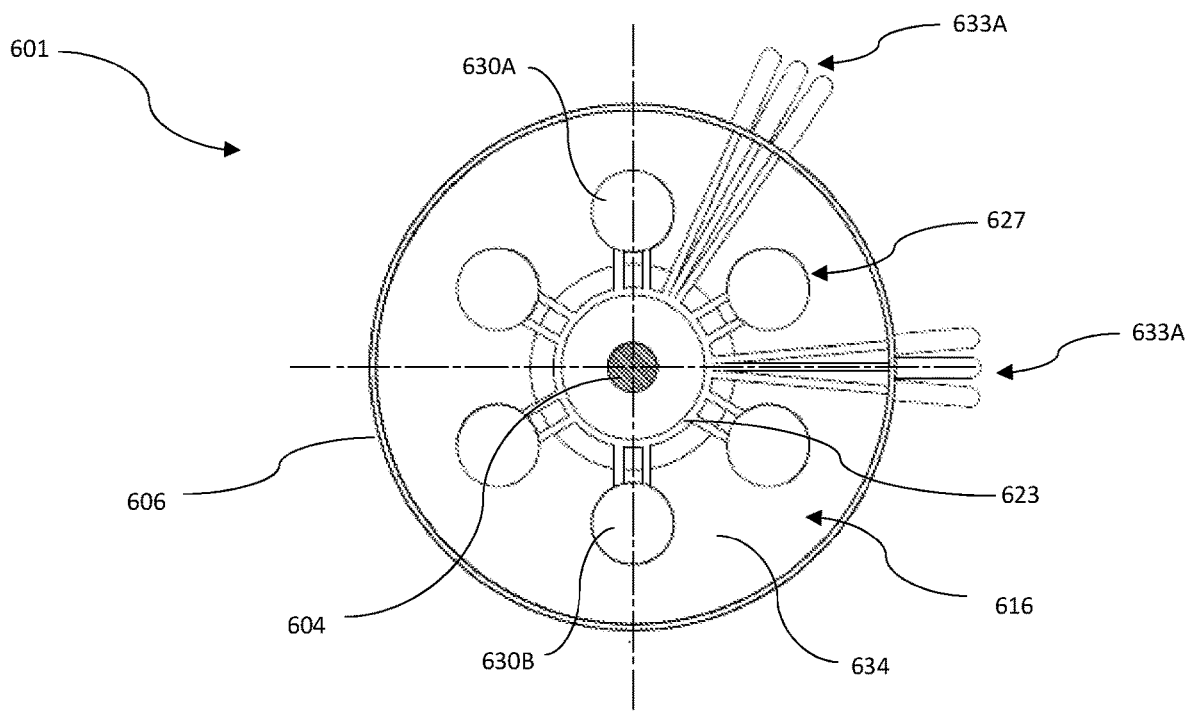
FIG. 6B shows a top-down cross-sectional view of the vertical axis of the wind turbine energy generator's magnetic chamber.

FIG. 6B exemplifies a top-down cross-sectional view of the vertical axis wind turbine energy generator 601, viewed across line 6B. The magnetic rotor chamber 616 may be internally positioned in the upper cylindrical frame 606 and may have the static induction coil assembly 627. The static induction coil assembly 627 may incorporate induction coil supporting frame 623 connected with series pairs of induction coils 630A and 630B on the assembly disc 634. Assembly disc 634 may have openings and grooves that corresponds to the induction coil supporting frame 623. The induction coil supporting frame 623 and series pairs of induction coils 630A and 630B may be firmly secured in the assembly disc 634 (more detailed explanation in FIG. 8, below).

Wires run in through the wire conduit 633A connecting in series pairs of induction coils 630A and 630B and run out through wire conduit 633B for further connection with other extension wires or electrical apparatus. Multiple wire conduits may be integrated depending on the number of desired series of pairs of induction coils 630A and 630B. The induction coil pairs illustrated here, but not enumerated, are also connected with one-another in series. The series pairs of induction coils 630A and 630B are referenced as exemplary of the system.

Figure 7A:
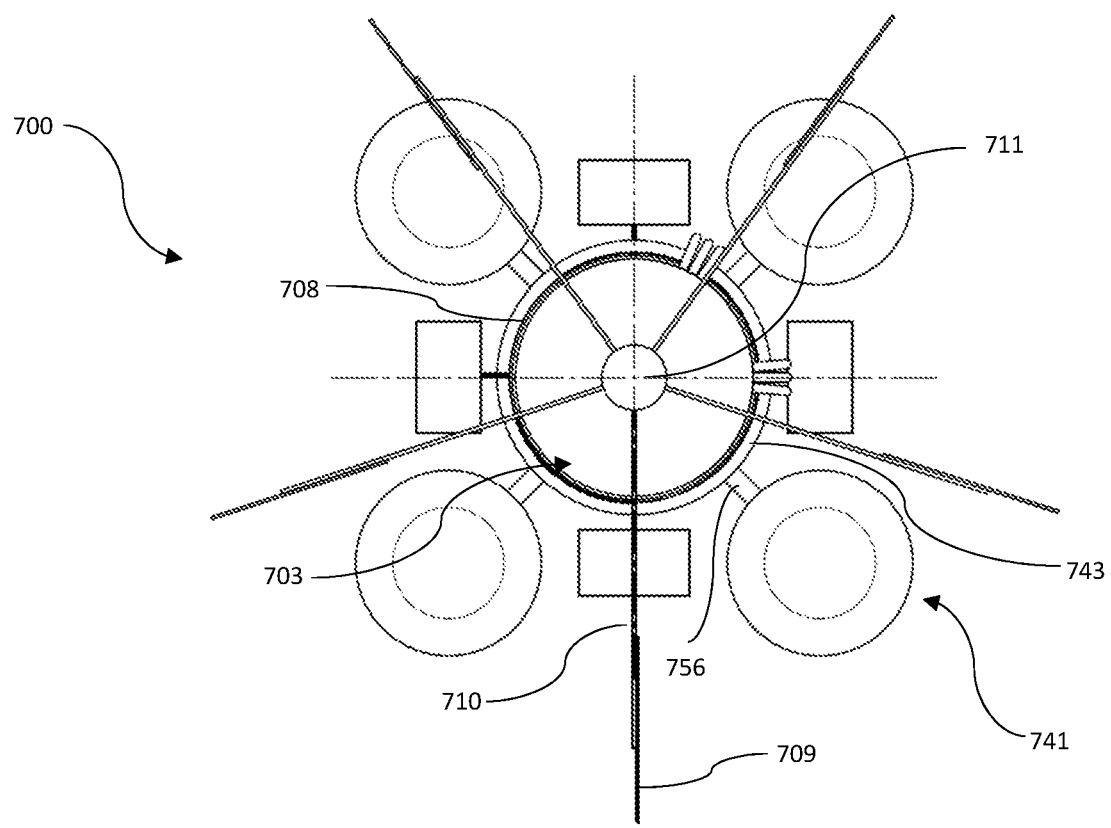
FIG. 7A shows a top view of the vertical axis of the wind turbine energy generator.

FIG. 7A exemplifies a top view of the wind turbine and wave/tidal energy generator 700, viewed across line 7A. Referring to the vertical axis blade assembly 703, the plurality of blades 709 may be connected to the plurality of supporting arms 710 which may be fixed to hub 711. The kinetic energy from the wind is captured by the plurality of blades 709, thereby rotating the vertical axis assembly 703 around rotor shaft 804 (see FIG. 8). Floating assembly 741 may incorporate a plurality of buoys 742, each of which may be attached to a ring 743 through supporting arm 756. Ring 743 may be secured to the upper part of the lower cylindrical frame 708.

Figure 7B:
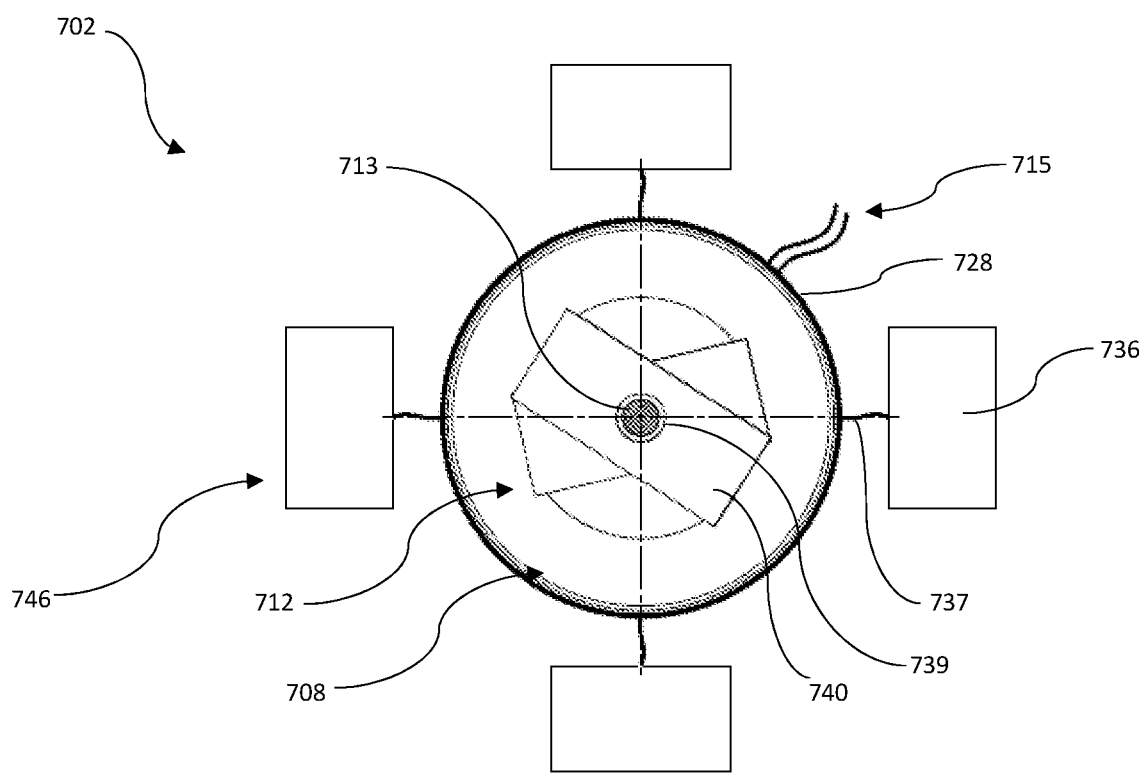
FIG. 7B shows a top cross-sectional view of the wave/tidal energy generator.

FIG. 7B exemplifies a cross sectional top view of the wave/tidal energy generator 702, viewed across line 7B. The lower cylindrical frame 708 may internally incorporate the magnetic array chamber 712. Magnetic array chamber 712 may incorporate a magnetic array axle 713, to which a plurality of magnets 740 may be secured, which goes through the through hole 739. The lower cylindrical frame 708 may externally incorporate the relatively static induction coil assembly 746. The relatively static induction coil assembly 746 may incorporate an induction coil 728 which may be connected with buoys 736 through cables 737. The plurality of anchoring cables 544 (shown in FIG. 5 and also in FIG. 8 as 844) may be attached on the one end to the induction coil 728 and on the other end to the seabed, restraining the upward movement of the relatively static induction coil assembly 746. The wave/tidal energy generator 702, due to the positioning of the floating assembly 741 (shown in FIG. 7A), may be submerged into the body of water in such a way that the relatively static induction coil assembly 746 could remain in the same position in relation to the seabed while cylindrical frame 500A (shown in FIG.

5) may rise and fall in response to the waves/tides, at least along the length of the lower cylindrical frame 708. Thereby, the relatively static induction coil assembly 746 induces an electrical current by the reciprocating motion, in relation to the magnetic array chamber 712. Respective ends 715 of the relatively static induction coil assembly 746 extend out for further connection with other extension wires or external apparatus.

Figure 8:
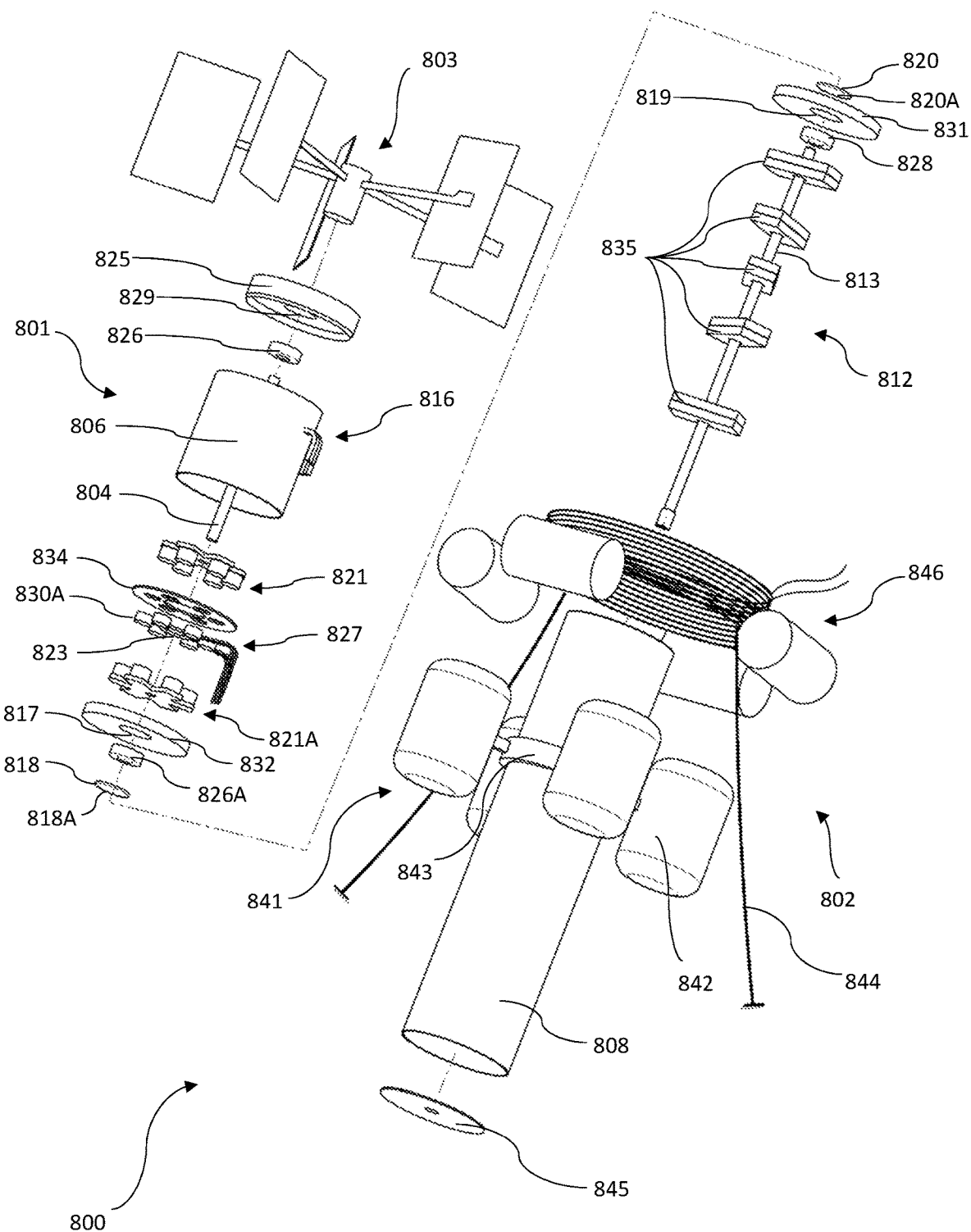
FIG. 8 shows an exploded view of the wind turbine and wave/tidal energy generator.

FIG. 8 exemplifies an exploded view of the wind turbine and wave/tide energy generator 800 to show the constituent parts in more detail. The upper part of the wind turbine and wave/tide energy generator 800 may incorporate, in its the upper part, a vertical axis wind turbine energy generator 801 and in the lower part, a wave/tide energy generator 802. The vertical axis wind turbine energy generator 801, in the upper part, may incorporate a vertical axis blade assembly 803, which may be connected to the rotor shaft 804 traveling through to the magnetic rotor chamber 816. An upper cylindrical frame 806 can include a magnetic rotor chamber 816 and a frictionless levitation chamber 514 (shown in FIG. 5).

The magnetic rotor chamber 816 may have a first through hole 829 disposed at top cap 825, and a second through hole 817 disposed at partition wall 832. The first bearing 826 may be provided in the first through hole 829 and the second bearing 826A may be provided in the second through hole 817. The rotor shaft 804 may be pivotally placed within the magnetic rotor chamber 816 through the first bearing 826 in the top cap 825 and through the second bearing 826A in partition wall 832. Magnet assemblies 821 and 821A are fixed to the rotor shaft 804 and in between them is located the static induction coil assembly 827. The static induction 827 may incorporate the induction coil supporting frame 823. Assembly disc 834 may have openings and grooves that corresponds to the induction coil supporting frame 823 and series pairs of induction coils 830A and 830B. The induction coil supporting frame 823 and series pairs of induction coils 830A and 830B may be firmly secured in the assembly disc 834. Rotor shaft 804 may freely rotate, responsive to the wind force exerting unto the vertical axis blade assembly 803, which rotates the magnet assemblies 821 and 821A around the static induction coil assembly 827 in order to generate electricity. Static induction coil assembly 827 may be secured to the upper cylindrical frame 806.

The wave/tide energy generator 802 may incorporate the lower cylindrical frame 808 which internally may incorporate a magnetic array chamber 812 and externally may incorporate the relatively static induction coil assembly 846 and the floating assembly 841. The floating assembly 841 may incorporate a plurality of buoys 842 connected to a ring 843. The lower cylindrical frame 808 may externally incorporate the ring 843 which may be tightly secured to its upper part. The magnetic array chamber 812 may incorporate a magnetic array axle 813. A plurality of magnets 835 may be attached to magnetic the array axle 813 in some order along the length of the magnetic array axle 813. The magnetic array axle 813 may be secured in the upper portion to partition the wall 831 and in the lower portion to the lower cylindrical frame bottom cap 845. The lower cylindrical frame 808 may internally incorporate relatively static induction coil assembly 846. The plurality of anchoring cables 844 may be attached on the one end to the relatively static induction coil assembly 846 and on the other end to the seabed, restraining the upward movement of relatively static induction coil assembly 846.

Partition wall 831 may have a through hole 819. The magnetic array axle 813 may be inserted into the third bearing 828 which in turn is inserted through hole 819 and terminated with an attached static permanent magnet 820. The rotor shaft 804 may be inserted through the second through hole 817 and terminated with a revolving permanent magnet 818.

The static permanent magnet 820 may have repulsive surface 820A which may be counterposing the repulsive surface 818A of the revolving permanent magnet 818. The levitation force may be formed between the static permanent magnet 820 and the revolving permanent magnet 818. The levitation force reduces resistance while the rotor shaft 804 is driven by the vertical axis blade assembly 803 because the friction otherwise created is minimized if not entirely eliminated. Inevitably, this increases revolving efficiency and speed.

What is claimed is:

1. A wind turbine and wave/tidal energy apparatus, comprising:
   a vertical axis blade assembly;
   a lower cylindrical frame and an upper cylindrical frame rigidly connected to each other, having an interior cavity;
   the vertical axis blade assembly connected to a top section of a rotor shaft;
   a bottom section of the rotor shaft located in the upper cylindrical frame;
   a magnetic chamber housed inside an upper part of the upper cylindrical frame;
   a frictionless levitation chamber housed inside a lower part of the upper cylindrical frame;
   a revolving permanent magnet attached to a bottom of the rotor shaft;
   a magnetic array chamber housed inside the lower cylindrical frame;
   a magnetic array axle located inside the magnetic array chamber;
   a static permanent magnet attached to a top of the magnetic array axle; and
   an inductive coil externally located on the lower cylindrical frame.

2. The wind turbine and wave/tidal energy apparatus of claim 1, wherein the vertical axis blade assembly has a plurality of blades.

3. The wind turbine and wave/tidal energy apparatus of claim 1, wherein the frictionless levitation chamber is located below the magnetic chamber.

4. The wind turbine and wave/tidal energy apparatus of claim 1, wherein the revolving permanent magnet is located in the frictionless levitation chamber.

5. The wind turbine and wave/tidal energy apparatus of claim 1, wherein the magnetic array axle is located along a length of the lower cylindrical frame.

6. The wind turbine and wave/tidal energy apparatus of claim 1, wherein the static permanent magnet is located in the frictionless levitation chamber.

7. The wind turbine and wave/tidal energy apparatus of claim 1, wherein a plurality of magnets are connected to the magnetic array axle.

8. The wind turbine and wave/tidal energy apparatus of claim 7, wherein the plurality of magnets are spaced apart.

9. The wind turbine and wave/tidal energy apparatus of claim 1, wherein the inductive coil is connected to a plurality of buoys.

10. The wind turbine and wave/tidal energy apparatus of claim 9, wherein the inductive coil is connected to a plurality of anchoring cables.

11. The wind turbine and wave/tidal energy apparatus of claim 10, wherein a bottom of the magnetic array axle is connected to a bottom cap of the lower cylindrical frame.

12. The wind turbine and wave/tidal energy apparatus of claim 11, wherein a floating assembly is connected to an upper part of the lower cylindrical frame.

13. The wind turbine and wave/tidal energy apparatus of claim 9, wherein a cylindrical ballast footing is connected to a bottom of the lower cylindrical frame.

\* \* \* \* \*